(12) United States Patent (10) Patent No.: US 7,766,156 B2
Worner et al. (45) Date of Patent: Aug. 3, 2010

(54) ABUTMENT MODULE

(76) Inventors: Helmut Worner, Johann-Sebastian-Bach-Stabe 3, Denkendorf (DE) D-73770; Sebastian Unterhuber, Rilkeweg 4, Kongen (DE) D-73257

( * ) Notice: Subject to any disclaimer, the term of this patent is extended or adjusted under 35 U.S.C. 154(b) by 277 days.

(21) Appl. No.: 11/488,797

(22) Filed: Jul. 19, 2006

(65) Prior Publication Data

US 2007/0017909 A1 Jan. 25, 2007

(30) Foreign Application Priority Data

Jul. 19, 2005 (EP) .................................. 05015616
Oct. 21, 2005 (EP) .................................. 05022965

(51) Int. Cl.
  B65G 47/00 (2006.01)
  B65G 47/26 (2006.01)
  B65G 15/64 (2006.01)
  B65G 21/22 (2006.01)
  B65G 13/00 (2006.01)
(52) U.S. Cl. ..................... 198/530; 198/531; 198/534; 198/459.6; 198/345.3; 198/35 A; 269/47

(58) Field of Classification Search ................. 198/530, 198/531, 534, 459.6, 345.3; 193/35 A
See application file for complete search history.

(56) References Cited

U.S. PATENT DOCUMENTS

| 6,087,623 | A | 7/2000 | Kwon et al. |
| 6,202,821 | B1 * | 3/2001 | Crockett ................... 193/35 G |
| 6,981,428 | B2 * | 1/2006 | Donald et al. ............. 74/89.26 |
| 2005/0104268 | A1 * | 5/2005 | Migliori ..................... 269/47 |

FOREIGN PATENT DOCUMENTS

| DE | 38 10 754 A1 | 10/1989 |
| DE | 202 07 436 U1 | 7/2002 |
| EP | 0 038 871 A2 | 11/1981 |
| EP | 0 484 648 A1 | 5/1992 |

* cited by examiner

*Primary Examiner*—Gene Crawford
*Assistant Examiner*—Yolanda Cumbess
(74) *Attorney, Agent, or Firm*—Browdy and Neimark, PLLC

(57) ABSTRACT

A abutment module for automatic processing and conveying equipment having an abutment member arranged on a base for objects moving in a movement plane in a current direction of working motion. The abutment member being able to be moved in and out of the movement plane by electrical actuating apparatus. An electrical rotary drive is provided for the electrical operation.

5 Claims, 3 Drawing Sheets

ABUTMENT MODULE

BACKGROUND OF THE INVENTION

The invention relates to an abutment module more particularly for automatic processing and conveying equipment, comprising an abutment member arranged on a base for objects moving in a movement plane in a current direction of working motion, such abutment member being able to be moved out of such plane of movement and into it by an electrical operation.

THE PRIOR ART

Fluid power operated abutment modules are known, see for example the European patent publication 0 484 648. The abutment described therein is able to be shifted by the intermediary of a pneumatically operated setting piston out of the plane of motion of approaching workpieces and back into it. For compressed air operation a compressed air connection is provided for the regulated compressed air to be supplied by. Furthermore a damping means is provided for the abutment so that the movement of the abutting workpieces may be damped.

In certain processing and conveying equipment abutment modules operating with a fluid working medium, more especially compressed air, are however unsuitable since the fluid working medium may in this case lead to interference with the processing operation. As examples for this coating lines are to be named. In order to provide a remedy abutment modules have become known whose abutment members are electrically operated.

SHORT SUMMARY OF THE INVENTION

One object of the invention is to provide an abutment module of the type initially mentioned which as compared with conventional electrically operated abutment modules is more universal and more economic in application.

In order to achieve these and/or other objects appearing from the present specification, claims and drawings, in the present invention an abutment module, more especially for automatic processing and conveying equipment comprising an abutment member arranged on a base for objects moving in a movement plane in a current direction of working motion, such abutment member being able to be shifted by electrical operation out of such plane of movement and back into same, is characterized in that for the electrical operation of the abutment member an electrical rotary drive is provided. Further advantageous developments of the invention are defined in the claims.

Such electrical rotary drives are characterized by a relatively compact design so that they are able to be integrated into the abutment module. Furthermore the energy requirement is low in comparison with conventional electrically operated abutment modules. The abutment module in accordance with the invention accordingly possesses all in all a relatively compact design so that owing to the low energy requirement for the electrical rotary drive it may be employed economically in the most various automatic processing and conveying equipment and more particularly in those in which the employment of fluid power medium is problematic.

As an electrical rotary drive it is possible for example to employ an electrical servo motor. By means of the electrical rotary drive a rotational output drive movement may be produced, which by way of conversion means is able to be converted into a linear movement, directed toward the plane of motion of the objects or out of it. In principle it would however also be possible for the rotary movement to act directly on the abutment member, for example by the abutment member's being pivotally mounted and being rocked out of a into the plane of motion of the objects by means of the rotary movement.

In a particularly preferred manner the conversion means is in the form of a crank drive, which on the one hand is coupled with a rotationally driven output drive shaft of the electrical rotary drive and on the other hand with the abutment member. Such a crank drive is characterized by a relatively simple design and may accordingly be simply serviced and repaired when necessary.

The crank drive may have a crank disk rotatably connected with the output drive shaft and a crank linkage pivotally coupled on the one hand eccentrically to the axis of rotation of the output drive shaft more particularly releaseably on the crank disk and on the other hand pivotally coupled with the abutment member. Owing to the eccentric coupling it is possible, during one revolution of the crank disk, for the abutment member to be reciprocated between a top and a bottom point in a linear manner.

For setting the stroke of the crank linkage same may be pivotally secured selectively on different pivot points, placed eccentrically to the axis or rotation, on the crank disk.

As an alternative to the crank drive the conversion means may also be designed in the form of a rack and pinion combination, a pinion being arranged for example on the rotary drive shaft for engagement with a rack connected with the abutment member so that the rotary pinion movement is converted into a linear upward and downward movement of the rack. However it is necessary in this case for the direction of rotation to be reversed on switching over between upward and downward motion of the rack.

Another especially compact design of the abutment module is characterized in that the electrical rotary drive is in the form of a lead screw drive. The lead screw drive may as a conversion means have a lead screw and a lead screw nut cooperating with the lead screw.

It is possible for the electrical rotary drive, and more especially a lead screw drive, to have associated stroke promotion means which with an additional force promoting or aiding the downward stroke of the abutment member produced by the electrical rotary drive, out of the plane of motion. Once the abutment member is in its top functional position and once an object has struck, then during the downward stroke friction will result between the abutment member and the struck object so that during the downward stroke additional stroke force is necessary. This additional stroke force or additional force may then be provided by the stroke promotion means.

In a preferred design the stroke promoting means is in the form of at least one spring which at one end is supported in a stationary manner and at the other end bears against a lead screw nut, which moves linearly upward and downward, so that during the upward stroke it is tensioned and during the downward stroke it provides the additional force in the form of a resilient return force.

In the case of a further development of the invention the abutment member is so designed and so supported by the supporting means in a top functional position located in the plane of motion of the objects that objects moving selectively in a first direction of working motion or in a second direction of working motion normal to the first direction of working motion may be halted or singualarized. Accordingly it is possible, in accordance with the space requirement, to fit the abutment module in different directions of mounting on the processing and conveying equipment, because it does not have any preferred abutment direction for striking the abutment member. It is furthermore possible to fit the abutment module at a node or, respectively, at an intersection of a conveying means so that selectively or simultaneously objects coming from essentially perpendicularly offset direction of working motion may be singularized.

In a particularly preferred fashion the abutment module can possess a guiding unit for guidance of the abutment member during its motion out of the plane of motion of the objects or thereinto. The guiding unit may possess a more particularly slot-like receiving socket, into which the abutment member may be received, more particularly completely, in a bottom resting position and from which the abutment member partly projects in the top functional position. In at least one of the directions of working motion of the objects a wall section, arranged in the current direction of working motion behind the abutment member, of the guiding unit may serve as a support means The abutment member may be mounted for sliding movement by means of a plain bearing in the socket of the guiding unit. It is possible to use a lubricant, as for example grease to reduce friction between the vertically reciprocating abutment member and the guiding unit.

Further advantageous developments and convenient forms of the invention will be understood from the following detailed descriptive disclosure of preferred embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
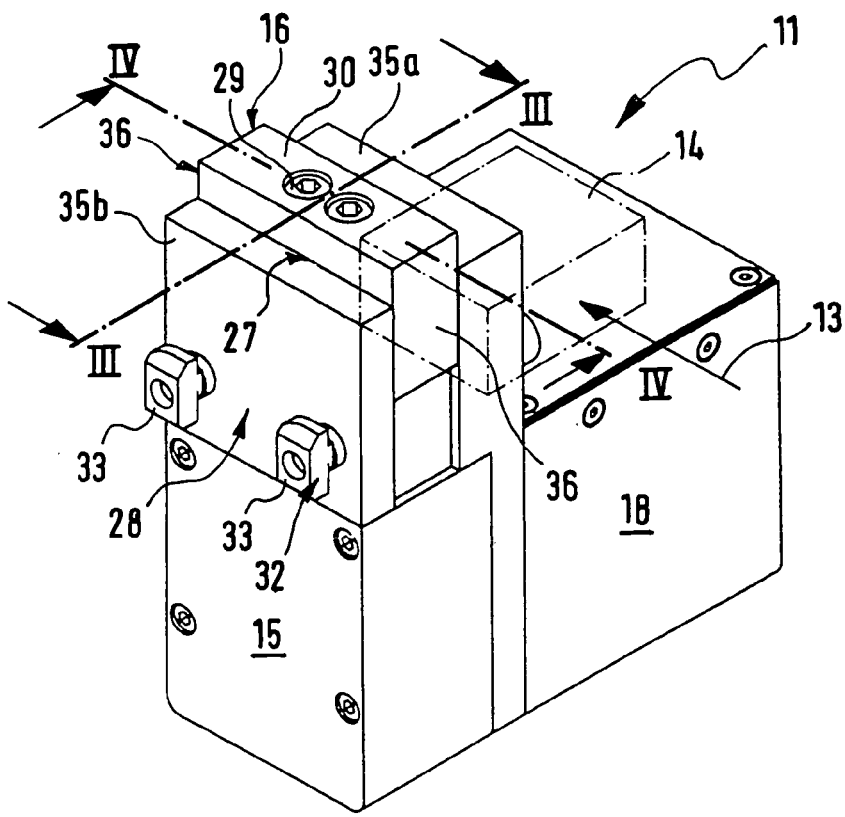
FIG. 1 shows a first embodiment of the abutment module in accordance with the invention in perspective.

FIGS. 1 through 4 show a first working embodiment of the abutment module 11 in accordance with the invention, which preferably is employed in automatic processing and conveying equipment in order to singularize objects 14, for example workpieces or the like, moving in a plane of motion in a first direction of working motion 12 (FIG. 2) or in a second direction 13 of working motion (FIG. 1) extending essentially perpendicularly to the first direction 12 of working motion. After singularizing the objects same may be individually treated, diverted or the like.

The abutment module 11 possesses a base 15 on which an abutment member 16 is arranged which by means of an electrical rotary drive 17 is able to be shifted out of the plane of motion of the objects 14 and back into it.

The electrical rotary drive 17 is according to a first embodiment of the invention in the form of an electrical servo-motor and is located in a drive module unit 18 separate from the base 15 and the abutment member 16. This drive module 18 may if necessary be secured to the base 15 detachably. The servo-motor of the electrical rotary drive 17 drives an output drive shaft 19 for rotation thereof and on the shaft 19, at the end remote from the motor, a crank disk 20 of a crank drive 21 connected with the output drive therewith.

The crank disk 20 possesses at its end an outwardly projecting pin 22, whose axis 23 is eccentric in relation to the axis 24 of rotation of the output drive shaft 19.

On the pin 22 a crank arm 25 of the crank drive 21 is mounted for rotary movement and for its part it is secured, at its end remote from the crank disk, in a rotatable manner to a base body 26, which is more particularly cylindrical, of the abutment member 16.

The crank disk 20 and the crank arm 25 are located in a receiving space 40 within the base 15, whereas the abutment member 16 is accommodated in a slot-like socket 27 in a guiding unit 28. This guiding unit 28 possesses two wall sections 35a and 35b, which are arranged on either side of the abutment member 16 and which, in a manner to be described below, serve as support means for the impact of an object 14.

As already mentioned the abutment member 16 possesses a base body 26, on which on the one hand the crank arm 25 of the crank drive 21 is pivoted in a rotary manner and on which on the other hand by way of attachment means, more especially attachment screws 29, an end abutment member 16 is secured, against which, in the projecting position, the objects 14 to be singularized may abut. The end part 30 and the base body 26 of the abutment member 16 possess, see more particularly FIG. 4, a generally T-like configuration, the end part 30 being relatively wide in form and extending essentially over the full width of the guiding unit 28. The base body 16 is mounted for sliding motion by a plain bearing generally in a cylindrical extension opening 31 in the slot-like socket 27. In order to reduce friction between the inner wall faces of the extension opening 31 and the cylindrical base body 26 a lubricant, more especially in the form of grease is employed.

On the guiding unit 28 there is furthermore a holder 32 by way of which the entire abutment module may be secured on processing and conveying equipment (not illustrated). The holder 32 may for example comprise two lead screw nut sockets 33 which each run on a threaded rod. Accordingly the abutment module 11 may for example be arranged in a rail (not illustrated).

Figure 4:
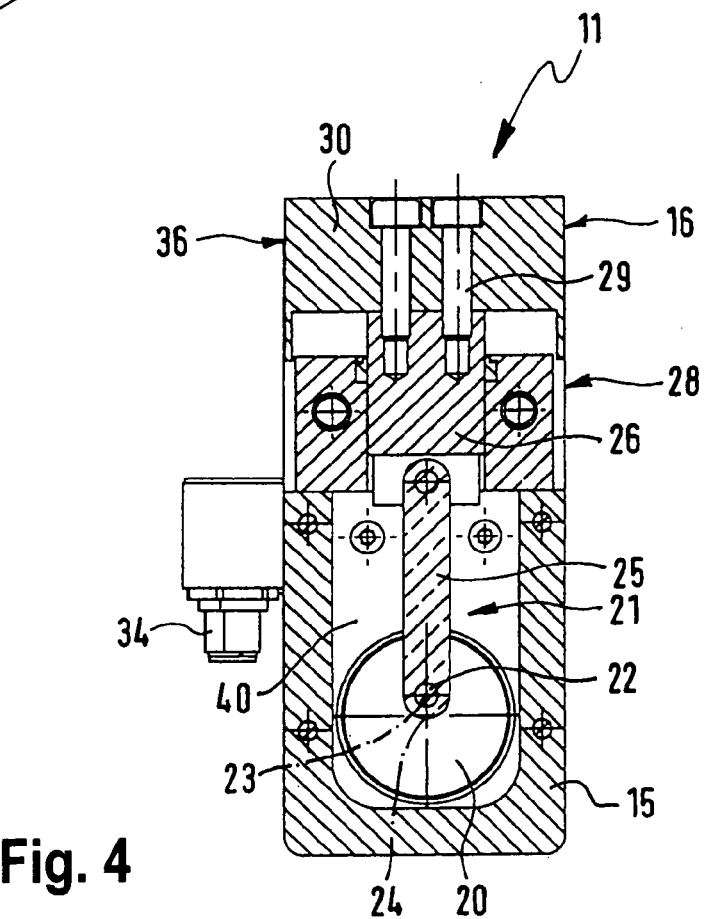
FIG. 4 shows a cross section through the abutment module of FIG. 1 along the line IV-IV of FIG. 1.
Figure 2:
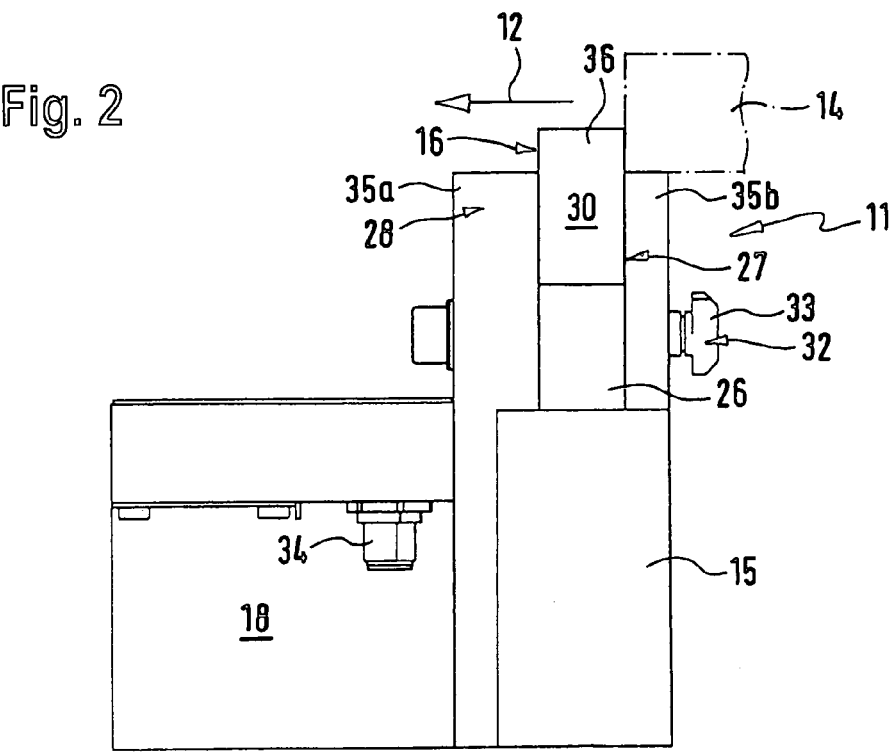
FIG. 2 shows the abutment module of FIG. 1 in a side view.
Figure 3:
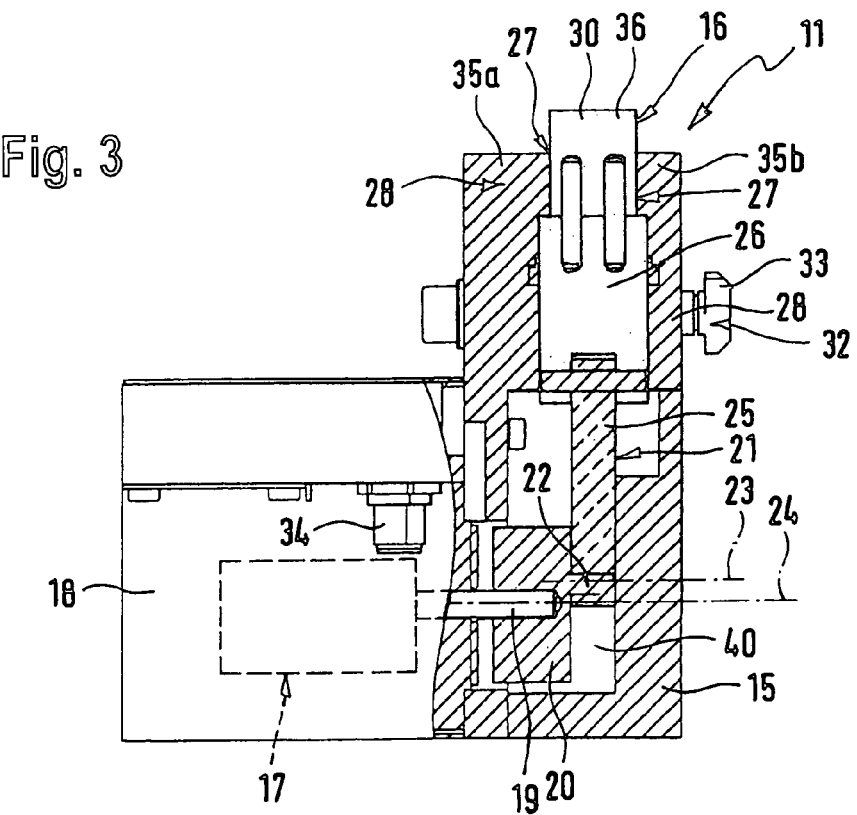
FIG. 3 shows a partial longitudinal section taken through the abutment module of FIG. 1 along the line III-III in FIG. 1.

Furthermore an electrical connection 34 is provided for electrical power supply to the electrical rotary drive 17, the electrical connection 34 being, as illustrated in FIGS. 2 through 4 for example, located on the outer side of the drive module unit 18.

In order to singularize an arriving object 14 firstly the electrical rotary drive 17 is gotten going so that the output drive shaft 19 is rotated. Then the crank disk 20 mounted on the output drive shaft 19 is entrained as well and dependent on the previous position is moved upward or downward owing to the eccentric pivoting action. The rotary of the output shaft 19 is continued until the abutment member 16 on the crank arm has reached its top position and accordingly is located in its top functional position. Then the servo-motor is stopped and the rotary movement of the output drive shaft 19 is thus halted. The abutment member 16 is now ready for singularizing or halting arriving objects 14. The objects can move selectively or also simultaneously in the first direction 12 of working motion and/or essentially perpendicularly thereto in the second direction 13 of working motion. As more particularly indicated in the FIGS. 1 and 2 the end part 30 of the abutment member 16 is, on impact of objects 14 traveling in the first direction 12 of working motion, supported by the wall section 35a, lying in the impact direction behind the abutment member 16, of the guiding unit 28. In this direction even relatively heavy objects may therefore be halted, while the narrow ends 36 of the end part are more suitable for halting lighter objects, since in this direction there is no support by the guiding unit.

For release of a halted object 14 the servo-motor is restarted so that the output shaft 19 turns on further and the end part 30 of the abutment member 16 enters its slot-like socket 27 so that the object 14 may pass.

Figure 5:
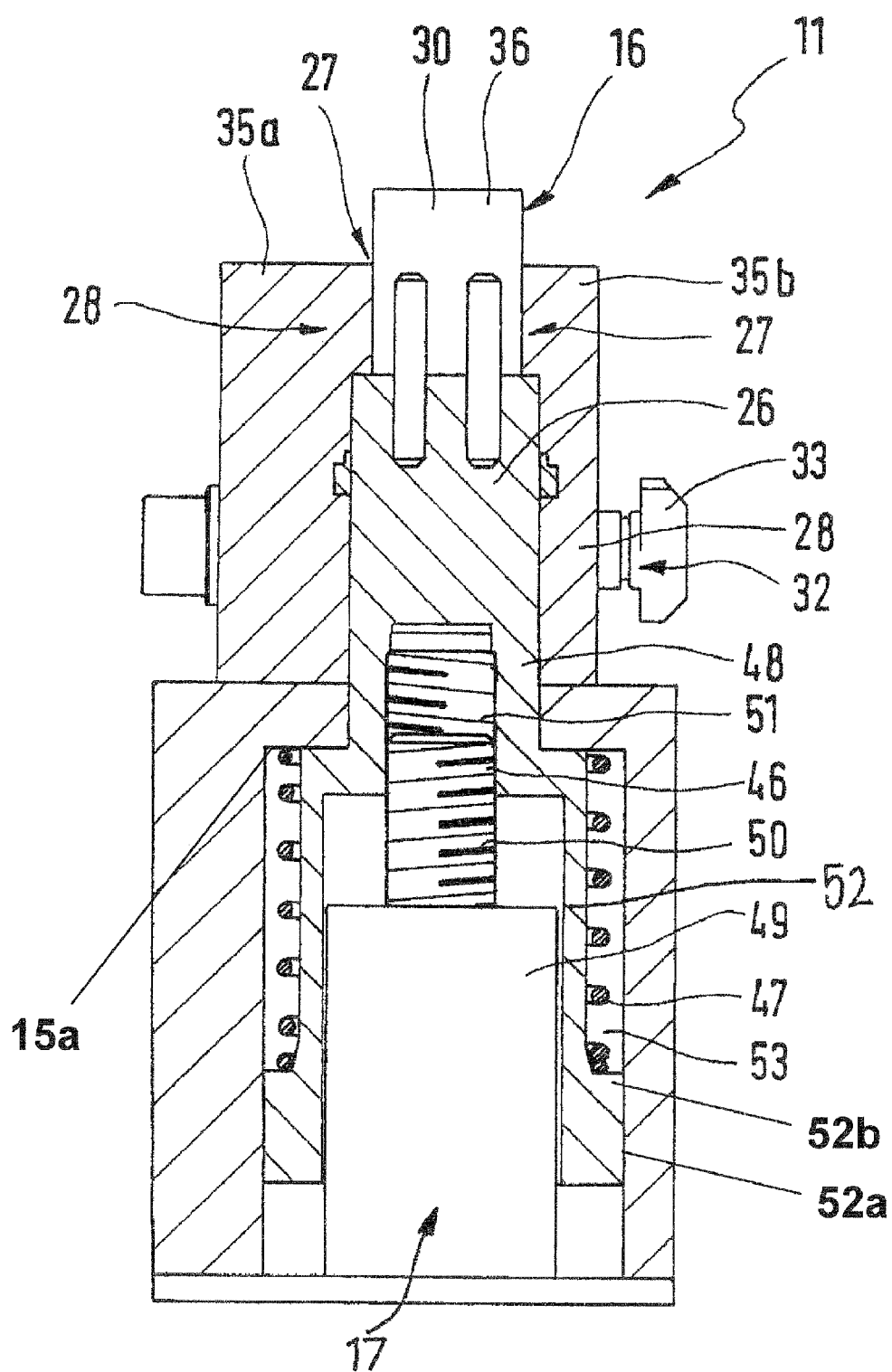
FIG. 5 shows a second working embodiment of the abutment module in accordance with the invention on a larger scale in accordance with the partial longitudinal section on the line III-III of FIG. 1.

FIG. 5 shows a second embodiment of the abutment module 11 in accordance with the invention, which differs from the first embodiment in that as an electrical rotary drive a lead screw drive 17 is employed. The lead screw drive comprises essentially a drive unit 49 driving a lead screw 46 coupled with it in rotation. The lead screw possesses a male thread 50 for cooperating with a female thread 51 in a lead screw nut 48 in such a manner that the lead screw nut 48 is screw-engaged with the lead screw to a greater or lesser degree dependent on the direction of rotation of the lead screw 46, i. e. the lead screw nut 48 selectively performs an upward or a downward movement.

As shown in FIG. 5 the lead screw nut 48 is constituted by the bottom part of the base body 26, whose top part is connected with the end part 30. The lead screw nut 48 furthermore has a sleeve section 52, which surrounds the drive unit 49 of the lead screw drive like a tube. On the tubular face 52a of the sleeve section 52 there is a cylindrical recess 53 in which stroke promoting means in the form of a spring 47 is integrated. The spring 47 bears on the one hand stationarily on a ledge 15a of the base body 15, and it bears on the other hand at the not recessed end portion 52b of the sleeve section 52.

In order to bring the abutment member 16 into its extended position the drive unit 49 is activated and the lead screw 46 is rotated so that the lead screw nut 48 screws its way down the guiding unit 46 and is thus moved upward. In this case the coupled abutment member 16 is also moved upward. Simultaneously the spring 47 is tensioned during the upward stroke. If the abutment member 16 is to be shifted back out of the plane of motion of the objects 14 into its retracted position, the direction of motion of the lead screw 46 is reversed and the lead screw nut 48 screws onto the lead screw 46, this causing the coupled abutment member 16 to perform a downward stroke. In the extended position of the abutment member 16 as a rule an object 14 to be singularized will have run against the abutment member 16 and is thus in contact with the abutment member 16. Accordingly during the downward stroke of the abutment member 16 there is friction between the abutment member 16 and the object 14. This makes necessary an additional stroke force, which in this case is furnished by the stroke promoting means in the form of the spring 47. Since the spring 47 is tensioned in the extended position of the abutment member 16, it may accordingly relax during the downward stroke again and thus provide its resilient return force in addition to the stroke force provided by the lead screw drive 17.

All in all the second working embodiment of the abutment module 11 in accordance with the invention is characterized by great compactness, since the lead screw drive 17 may generally be arranged in line underneath the abutment member 16.

The invention claimed is:

1. An abutment module for automatic processing and conveying equipment, comprising:
    an abutment member (16) arranged on a base (26) having a bottom part (48) and a top part, for objects moving in a movement plane in a current direction of working motion, the abutment member being movable in and out of a plane of movement by electrical operation of an electrical rotary drive in the form of a lead screw drive,
    wherein the lead screw drive comprises a motor (17), a lead screw (46) coupled and coaxial with the motor (17) and a lead screw nut (48) cooperating with the lead screw (46),
    the lead screw nut (48) comprising a cylindrical sleeve section (52) which coaxially surrounds the motor (17) like a tube,
    wherein said cylindrical sleeve section (52) comprises a tubular outer face on which a cylindrical recess (53) is provided,
    the sleeve section (52) of the lead screw nut (48) also comprising un-recessed end portion forming a shoulder,
    wherein said lead screw nut (48) constitutes a bottom part of the base (26),
    wherein said motor (17) produces a rotational output drive movement and rotationally drives said lead screw (46),
    wherein the rotational output drive movement is converted by the lead screw (46) and the lead screw nut (48) as conversion means to a linear movement which is directed in or out of the plane of motion of the abutment member (16),
    wherein the abutment module comprises stroke promoting means for the lead screw drive in the form of at least one spring (47), and
    wherein said spring (47) is integrated in the cylindrical recess of the sleeve section (52) and bears stationarily on the base (26) and also bears on the shoulder of the un-recessed end portion of the sleeve section (52).

2. The abutment module as set forth in claim 1, wherein the abutment member is configured to bear by support apparatus in a top functional position located in the plane of motion of the objects so that the objects moving in a first direction of working motion or in a second direction of working motion which is substantially normal to the first direction of working motion is selectively brought to a halt.

3. The abutment module as set forth in claim 1, comprising a guiding unit for guidance of the abutment member in its motion out of and into the plane of motion of the objects.

4. The abutment module as set forth in claim 3, wherein the guiding unit member has a slot-like socket into which the abutment member can be lowered in a bottom rest position, and from which the abutment member partly projects in the top functional position, and
    wherein a wall section of the guiding unit serves as a support elements in the current direction of working motion, wherein the wall section being behind the abutment member.

5. The abutment module as set forth in claim 4, wherein the abutment member is supported in a sliding manner by a plain bearing in the socket.

* * * * *